(12) United States Patent
Krumanaker et al.

(10) Patent No.: US 10,364,681 B2
(45) Date of Patent: Jul. 30, 2019

(54) TURBINE BLADE

(71) Applicant: General Electric Company, Schenectady, NY (US)

(72) Inventors: Matthew Lee Krumanaker, Blue Ash, OH (US); Robert Frederick Bergholz, Loveland, OH (US); Aaron Ezekiel Smith, Montgomery, OH (US); Weston Nolan Dooley, West Chester, OH (US)

(*) Notice: Subject to any disclaimer, the term of this patent is extended or adjusted under 35 U.S.C. 154(b) by 191 days.

(21) Appl. No.: 14/884,057

(22) Filed: Oct. 15, 2015

(65) Prior Publication Data

US 2017/0107825 A1 Apr. 20, 2017

(51) Int. Cl.
*F01D 5/18* (2006.01)

(52) U.S. Cl.
CPC ........ *F01D 5/187* (2013.01); *F05D 2260/203* (2013.01); *F05D 2260/941* (2013.01); *Y02T 50/676* (2013.01)

(58) Field of Classification Search
CPC . F01D 5/147; F01D 5/18; F01D 5/186; F01D 5/187; F01D 5/188; F01D 5/189; F01D 25/12; F05D 2260/20; F05D 2260/203; F05D 2260/204; F05D 2260/2212; F05D 2260/22141; F05D 2260/941
See application file for complete search history.

(56) References Cited

U.S. PATENT DOCUMENTS

| 4,286,924 A | * | 9/1981 | Gale | F01D 5/187 |
| | | | | 415/115 |
| 4,770,608 A | * | 9/1988 | Anderson | F01D 5/186 |
| | | | | 415/115 |
| 5,342,172 A | | 8/1994 | Coudray et al. | |
| 5,392,515 A | * | 2/1995 | Auxier | B23P 15/04 |
| | | | | 29/463 |
| 5,660,524 A | | 8/1997 | Lee et al. | |
| 5,813,835 A | * | 9/1998 | Corsmeier | F01D 5/186 |
| | | | | 415/115 |
| 5,820,336 A | | 10/1998 | Hashimoto | |

(Continued)

FOREIGN PATENT DOCUMENTS

| CN | 103492677 A | 1/2014 |
| CN | 104603399 A | 5/2015 |

(Continued)

OTHER PUBLICATIONS

European Search Report and Opinion issued in connection with corresponding EP Application No. 16191837.0 dated Feb. 14, 2017.

(Continued)

*Primary Examiner* — David E Sosnowski
*Assistant Examiner* — Sang K Kim
(74) *Attorney, Agent, or Firm* — McGarry Bair PC (57) ABSTRACT

An engine comprises an airfoil having at least one internal cooling circuit extending radially from the longitudinal axis of the engine. The cooling circuit is defined by at least one rib extending across an interior of the airfoil and at least one internal wall defining an internal passage. The internal wall further defines one or more near wall cooling passages. A thermal stress reduction structure is provided between the rib and the internal wall, providing efficient cooling at a junction between the rib and the internal wall.

19 Claims, 5 Drawing Sheets

(56) References Cited

U.S. PATENT DOCUMENTS

| | | | |
|---|---|---|---|
| 5,820,774 A * | 10/1998 | Dietrich | B22C 9/10 164/369 |
| 6,264,428 B1 | 7/2001 | Dailey et al. | |
| 7,258,528 B2 | 8/2007 | Trindade et al. | |
| 7,527,475 B1 | 5/2009 | Liang | |
| 7,717,676 B2 * | 5/2010 | Cunha | B22C 9/04 416/97 R |
| 7,819,629 B2 * | 10/2010 | Liang | F01D 5/187 415/115 |
| 8,382,439 B1 | 2/2013 | Brown | |
| 8,764,394 B2 | 7/2014 | Lee et al. | |
| 2003/0059305 A1 | 3/2003 | Bather et al. | |
| 2011/0110772 A1 | 5/2011 | Arrell et al. | |
| 2014/0075947 A1 * | 3/2014 | Gautschi | F01D 5/189 60/726 |
| 2014/0286791 A1 | 9/2014 | Lee et al. | |
| 2015/0184519 A1 | 7/2015 | Foster et al. | |
| 2017/0107824 A1 | 4/2017 | Krumanaker et al. | |
| 2017/0107826 A1 | 4/2017 | Krumanaker et al. | |
| 2017/0107827 A1 | 4/2017 | Krumanaker et al. | |
| 2017/0107828 A1 | 4/2017 | Krumanaker et al. | |
| 2017/0107829 A1 | 4/2017 | Krumanaker et al. | |

FOREIGN PATENT DOCUMENTS

| | | |
|---|---|---|
| EP | 2336493 A2 | 6/2011 |
| WO | 2013181132 A1 | 12/2013 |
| WO | 2015/042009 A1 | 3/2015 |

OTHER PUBLICATIONS

Machine translation and First Office Action and Search issued in connection with corresponding CN Application No. 201610897016.6 dated Dec. 20, 2017.

Third Office Action and Search issued in connection with corresponding CN Application No. 201610897016.6 dated Dec. 12, 2018 (English Translation not available).

* cited by examiner

TURBINE BLADE

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect, the invention relates to an airfoil having an outer surface bounding an interior. The airfoil defines a pressure side and a suction side, extends axially between a leading edge and a trailing edge, and extends radially between a root and a tip. The airfoil further comprises a structural rib spanning the interior and extending between the pressure side and the suction side of the outer surface to define a first direction of extension, a wall located near and extending along the outer surface in a second direction of extension with the wall at least partially defining a near wall cooling passage adjacent the outer surface, and a thermal stress reduction structure provided between the structural rib and the wall at a position adjacent a junction of the first and second directions of extension.

In another aspect, the invention relates to a blade for a gas turbine engine having a turbine rotor disk. The blade comprises a dovetail having at least one cooling air inlet passage and is configured to mount to the turbine rotor disk. The blade further comprises an airfoil extending radially from the dovetail and having an outer surface bounding an interior. The airfoil further defines a pressure side and a suction side extending axially between a leading edge and a trailing edge, and extending radially between a root and a tip with the root being adjacent the dovetail. The blade further comprises at least one cooling circuit fluidly coupled to the cooling air inlet passage and located within the interior, and has a first interior wall forming a first set of near wall cooling passages along the outer surface to separate the cooling circuit form the rest of the interior, and a cavity provided between the first interior wall and the dividing wall such that the near wall cooling passages are not formed by the first structural rib.

In another aspect, the invention relates to an airfoil for a gas turbine engine having a peripheral wall bounding an interior and defining a pressure side and a suction side, opposite the pressure side, a structural rib spanning the interior between the pressure side and the suction side, and an inner wall located within the interior and separated from the structural rib by a thermal stress reduction structure.

DESCRIPTION OF EMBODIMENTS OF THE INVENTION

The described embodiment is directed to a turbine blade, and in particular to cooling a turbine blade. For purposes of illustration, the present invention will be described with respect to a turbine blade for an aircraft gas turbine engine. It will be understood, however, that the invention is not so limited and can have general applicability in non-aircraft applications, such as other mobile applications and non-mobile industrial, commercial, and residential applications.

Figure 1:
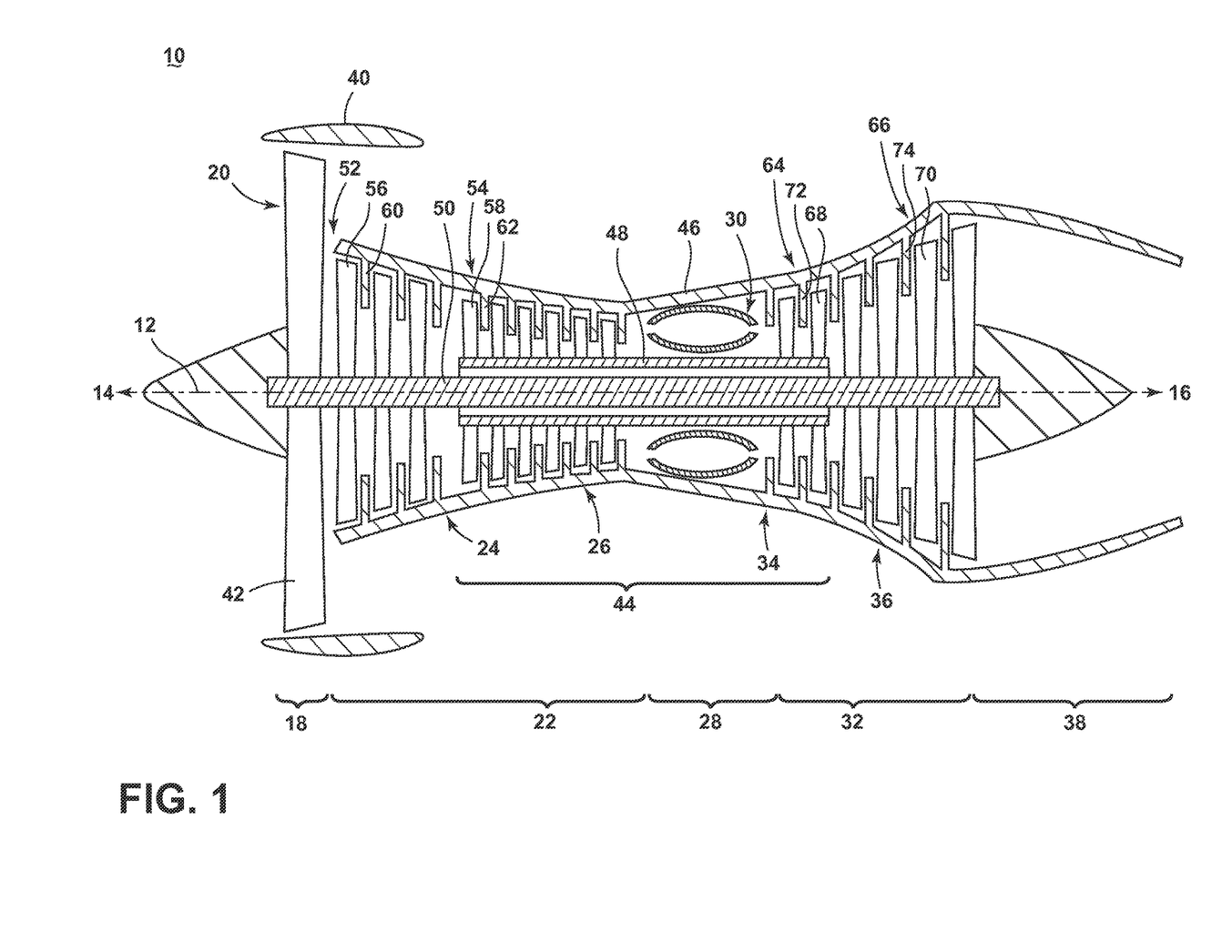
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of airfoils in the form of fan blades 42 disposed radially about the centerline 12. The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of rotating airfoils in the form of compressor blades 56, 58 that rotate relative to a corresponding set of static airfoils in the form of compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of rotating airfoils in the form of turbine blades 68, 70 that are rotated relative to a corresponding set of static airfoils in the form of turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
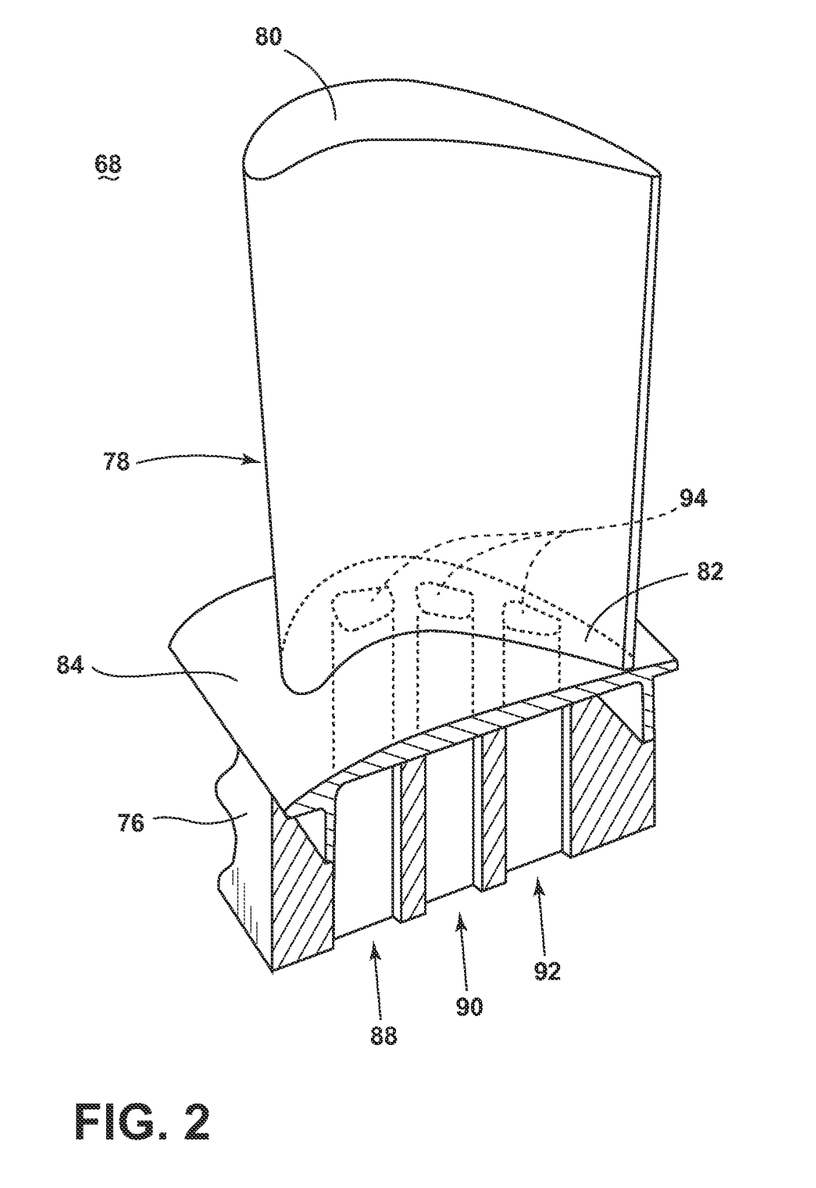
FIG. 2 is a perspective view of a turbine blade of the engine of FIG. 1 including an airfoil attached to a root.

FIG. 2 is a perspective view of an engine component in the form of one of the turbine blades 68 of the engine 10 of FIG. 1. The turbine blade 68 includes a dovetail 76 and an airfoil 78. The airfoil 78 includes a tip 80 and a root 82. The root 82 further includes a platform 84 integral with the airfoil 78 at the root 82, which helps to radially contain the turbine air flow. The dovetail 76 can be configured to mount to a turbine rotor disk on the engine 10. The dovetail 76 comprises at least one inlet passage, exemplarily shown as a first inlet passage 88, a second inlet passage 90, and a third inlet passage 92, each extending through the dovetail 76 to provide internal fluid communication with the airfoil 78 at a plurality of passage outlets 94. It should be appreciated that the dovetail 76 is shown in cross-section, such that the inlet passages 88, 90, 92 are housed within the body of the dovetail 76.

Figure 3:
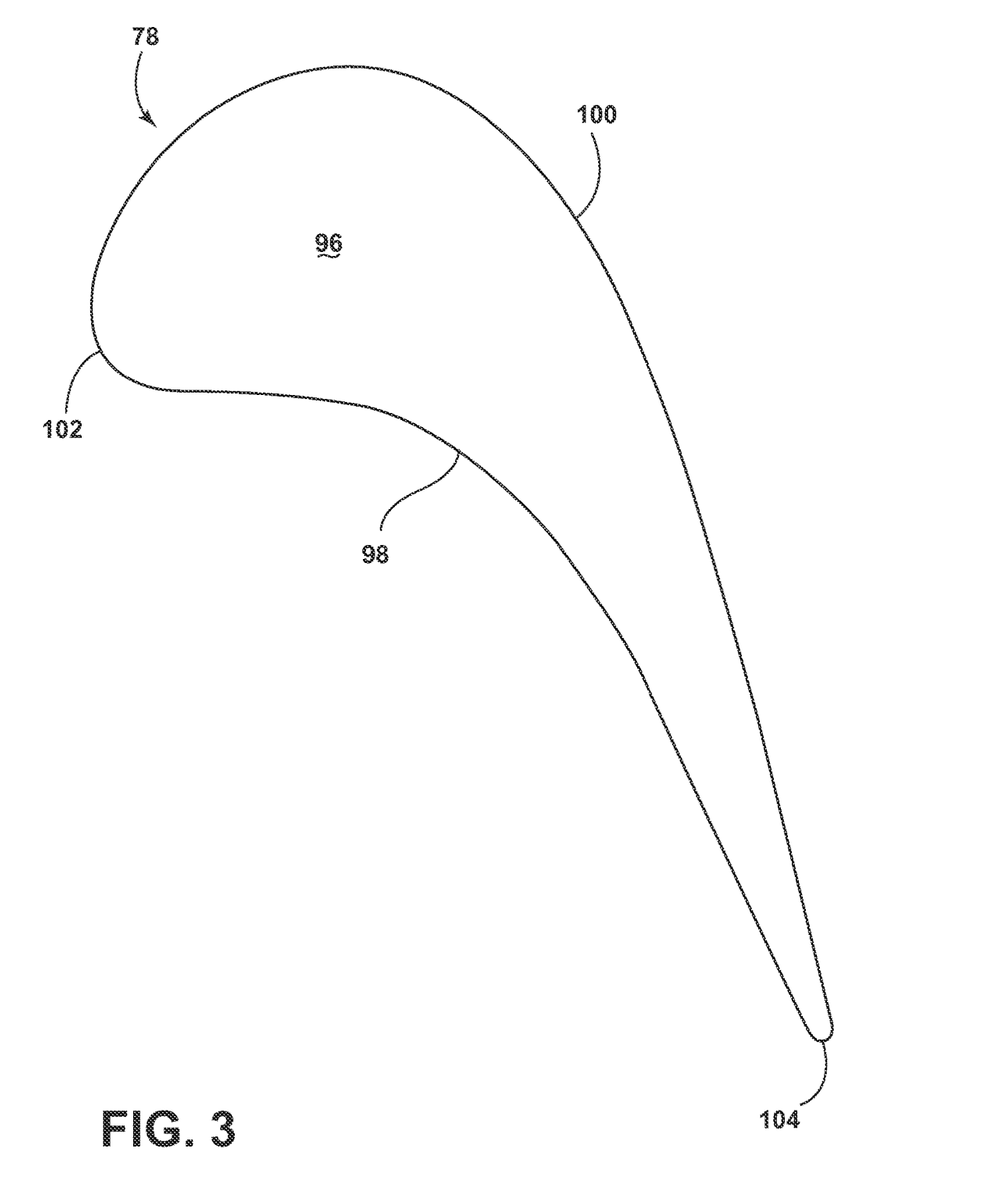
FIG. 3 is a cross-sectional view of the airfoil of FIG. 2.

Turning to FIG. 3, the airfoil 78, shown in cross-section, has an interior 96, defined by a concave-shaped pressure sidewall 98, defining a pressure side, and a convex-shaped suction sidewall 100, defining a suction side, which are joined together to define the airfoil shape with a leading edge 102 and a trailing edge 104. The airfoil 78 rotates in a direction such that the pressure sidewall 98 follows the suction sidewall 100. Thus, as shown in FIG. 3, the airfoil 78 would rotate upward toward the top of the page.

The airfoil 78 comprises a plurality of internal passages that can be arranged to form cooling circuits dedicated to cool a particular portion of the blade. A cooling circuit comprises one or more cooling passages extending between the tip 80 and the root 82 of the airfoil 78. The passages and the corresponding cooling circuits, illustrated in FIG. 4, best exemplify one or more thermal stress reduction structures defined within one or more of the internal passages or cooling circuits. The layout, placement, shape, and size of the internal passages are exemplary, and should not be construed as limiting of the invention.

Figure 4:
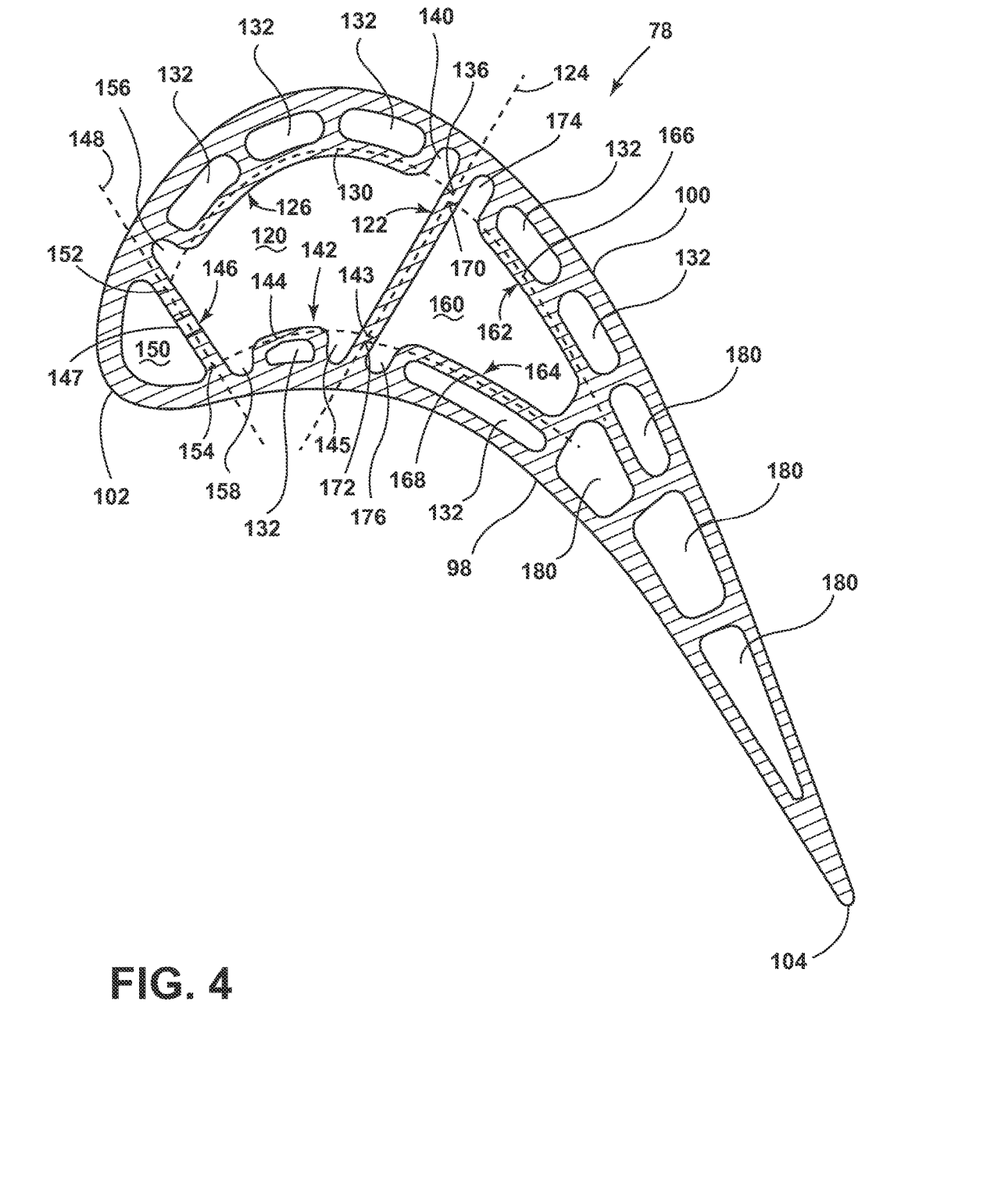
FIG. 4 is a diagram of the cross-sectional airfoil of FIG. 3 illustrating one or more internal passages with a plurality of thermal stress reduction structures.

A first internal passage 120 can extend radially between the root 82 and the tip 80 defined within the interior 96 of the airfoil 78. The first internal passage 120 comprises a hollow channel which can receive a flow cooling fluid from at least one inlet passage 88, 90, 92. The first internal passage 120 can be at least partially defined by a first structural rib 122, spanning the interior 96 and extending between the pressure sidewall 98 and the suction sidewall 100 of the airfoil 78. The first structural rib 122 can further define a first direction of extension illustrated as a rib axis 124 defined by the longitudinal direction of the first structural rib 122 shown in cross-section.

The first internal passage 120 can be further defined by one or more internal walls. A first wall 126, disposed between the first internal passage 120 and the suction sidewall 100, can define a second direction of extension, as a first wall axis 130 defined by the longitudinal curve of the first wall 126, shown in cross-section. The first wall 126 can also at least partially define one or more near wall cooling passages 132, disposed between the first internal passage 120 and the exterior of the airfoil 78, shown adjacent to the suction sidewall 100. Alternatively, the first wall 126 and near wall cooling passages 132 can be adjacent to the pressure sidewall 98. The near wall cooling passages 132 can be in fluid communication with the first internal passage 120, such that the combination thereof can define a cooling circuit within the interior 96 of the airfoil 78.

The rib axis 124 can intersect the first wall axis 130 at a first junction 136. A thermal stress reduction structure is provided between the structural rib 122 and the first wall 126 at a position adjacent to the junction 136 and the suction sidewall 100. The thermal stress reduction structure can also be defined as a first cavity 140 provided between the structural rib 122 and the first wall 126. The cavity 140, as shown, defines an arcuate, substantially semi-circular shape, at least partially defining the first internal passage 120 and disposed between the structural rib 122 and the first wall 126.

Opposite of the first wall 126, a second wall 142, partially defining the first internal passage 120, further defines one or more near wall cooling passages 132 adjacent to the pressure sidewall 98. A curved second wall axis 144 is defined longitudinally by the arcuate shape of the cross-section of the second wall 142. Similar to the first junction 136, the second wall axis 144 can intersect the first rib axis 124 at a second junction 143. A thermal stress reduction structure, illustrated as a second cavity 145, is provided between the structural rib 122 and the second wall 142.

In addition to the first structural rib 122, the interior 96 of the airfoil 78 can comprise additional structural ribs. A second structural rib 146 is disposed near the leading edge 102, and adjacent to a leading edge cooling passage 148. The second structural rib 146 spans the interior 96 between the pressure sidewall 98 and the suction sidewall 100 further defining the first interior passage 120 opposite of the first structural rib 122. The second structural rib 146 further defines a second rib axis 148 defined longitudinally through the cross-section of the second structural rib 146. The second structural rib 146 can comprise one or more impingement openings 147, disposed radially along the second structural rib 146 relative to the longitudinal engine axis 12 of FIG. 1. The impingement openings 147 fluidly couple the first internal passage 120 to the leading edge passage 148.

The second structural rib 146 can be adjacent to the first wall 126 and the second wall 142, such that two additional junctions 152, 154 can be defined at the intersection between the second rib axis 148 and the first and second wall axes 130, 144, respectively. Similar to the first junction 136, the third and fourth junctions 152, 154 are adjacent to two additional thermal stress reduction structures, illustrated as cavities 156, 158, respectively. The cavities 156, 158 disposed between the second rib 146 and the first and second walls 126, 142, respectively.

A second internal passage 160 is defined within the interior 96 of the airfoil 78, being partially defined by and adjacent to the first structural rib 122 and positioned opposite of the first internal passage 120 relative to the first structural rib 122. The second internal passage 160 can comprise a hollow channel, extending radially between the root 82 and the tip 80, which can receive a flow of cooling fluid from at least one inlet passage 88, 90, 92. The second internal passage 160 is further defined by a third wall 162 and a fourth wall 164 located adjacent to the suction sidewall 100 and the pressures sidewall 98, respectively. The third and fourth walls 162, 164 each define one or more near wall cooling passages 132 between the suction sidewall 100 and the pressure sidewall 98, respectively. The third wall 162 defines a third wall axis 166 and the fourth wall 164 defines fourth wall axis 168, each axis being defined longitudinally through the generally arcuate cross-section of the walls 162, 164. The third wall axis 166 can intersect the first rib axis 124 at a fifth junction 170 and the fourth wall axis 168 can intersect the first rib axis 124 at a sixth junction 172. A thermal stress reduction structure, illustrated as a fifth cavity 174, is defined between the third wall 162 and the first structural rib 122, adjacent to the fifth junction 170. Similarly, another thermal stress reduction structure, illustrated as a sixth cavity 174, is defined between the first structural rib 122 and the fourth wall 164, adjacent to the sixth junction 172.

The airfoil 78 can comprise additional internal passages 180, which can or cannot comprise thermal stress reduction structures, near wall cooling, or otherwise. These internal passages 180 can extend between the tip 80 and the root 82, and can be in fluid communication with additional internal passages, such as the first internal passages 120 or the second internal passage 160, as well as with other additional passages 180, the combination of which can define a cooling circuit.

The thermal stress reduction structures comprising one or more cavities 140, 156, 158, 174, 176, while illustrated as a substantially semi-circular shape, can have any suitable shape. The semi-circular shape eliminates sharp corners which are more quickly impacted by thermal stresses than the semi-circular or rounded corners. The cavities can further be a gap disposed between the or at least partially defined by one or more of the adjacent structural ribs or walls. The shape of the gap or cavity as shown is exemplary and can be substantially quadrilateral, elliptical, circular, unique, or otherwise shaped such that a thermal stress reduction structure is defined between one or more structural ribs or walls. The gap or cavity can comprise a thickness being less than or equal to the cross-sectional thickness of at least one of the structural ribs and walls. Furthermore, the gap or cavity can comprise thickness equal to that of an exterior surface of the airfoil 78, such as the pressure sidewall 98 or the suction sidewall 100.

It should be appreciated that the number, position, and orientation of the thermal stress reduction structures, ribs, and internal walls are exemplary. The airfoil 78 can comprise thermal stress reduction structures depending on the number and placement of ribs and internal walls. It should be further appreciated that while FIG. 4 illustrates a cavity between each adjacent rib and internal wall, some near wall cooling passages can be defined by a combination of one or more ribs and internal walls without a thermal stress reduction structure disposed adjacent the ribs and internal walls.

It should be further appreciated that the near wall cooling passages, while illustrated as being relatively large, can be very small, such that the near wall cooling passages have a much smaller cross-sectional area as compared to the cross-sectional area illustrated in the figures.

Figure 5:
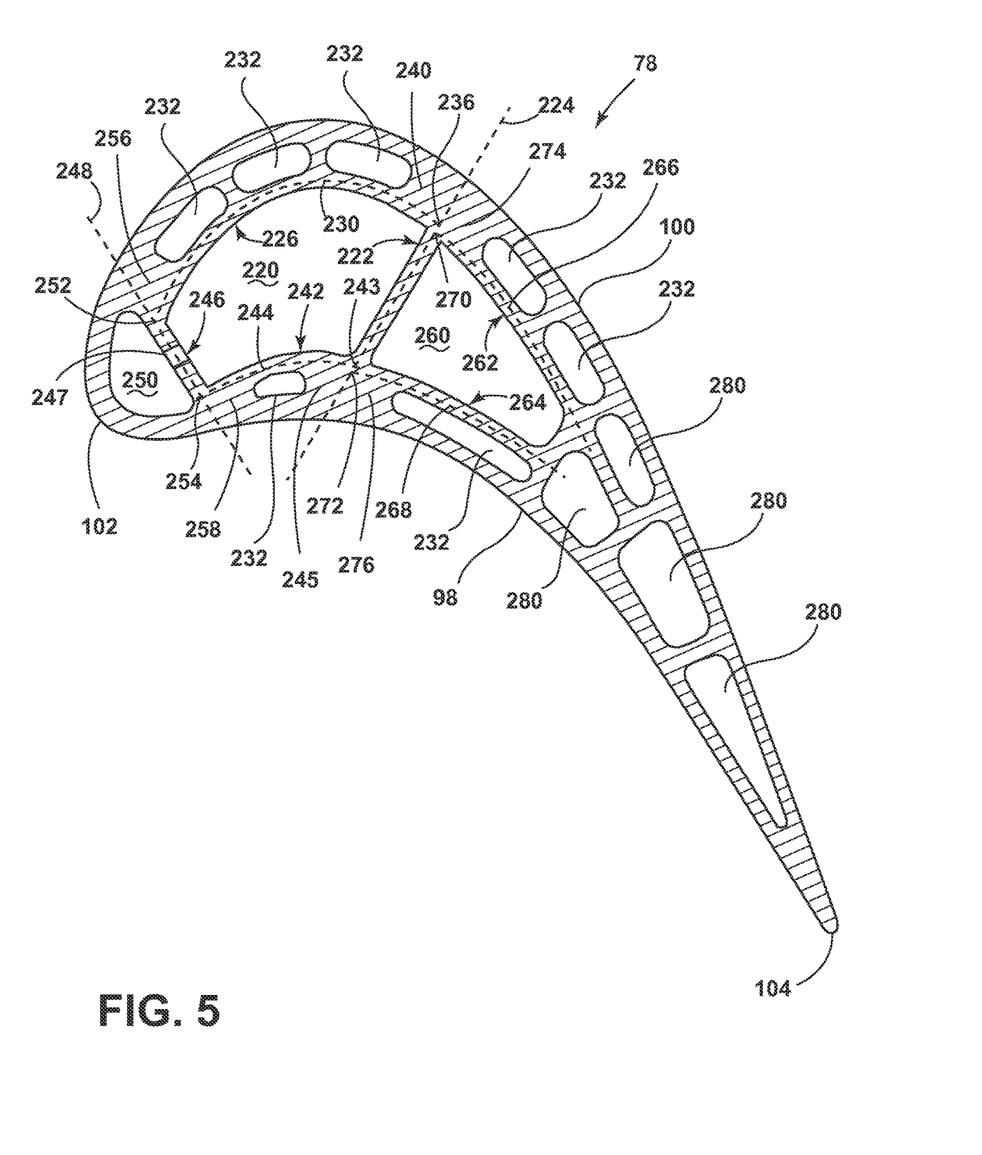
FIG. 5 is a cross-sectional diagram of an airfoil of FIG. 4 without the thermal stress reduction structures.

Turning to FIG. 5, an exemplary cross-section of the airfoil 78 of FIG. 2 showing the internal structure of the airfoil 78 without the thermal stress reduction structures, best illustrates an increased thickness of the internal walls adjacent to the rib and internal wall structures in comparison to FIG. 4. The airfoil 78 of FIG. 5 can be substantially similar to the airfoil 78 of FIG. 4 and similar structures will be identified with similar numerals increased by one-hundred. It should be appreciated that the airfoil 78 of FIG. 5 is exemplary of the problem the airfoil 78 of FIG. 4 solves.

As can be appreciated, the cavities 140, 145, 156, 158, 174, 176 of FIG. 4 have been replaced by an extension of walls 226, 242, 262, 264, between respective structural ribs 222, 246 in FIG. 5. As such, the cavities 140, 145, 156, 158, 174, 176 now comprise a plurality of thickened wall areas 240, 245, 256, 258, 274, 276 in FIG. 5. The thickened wall areas 240, 245, 256, 258, 274, 276 define a larger volume for which heat can reside within the interior 96 of the airfoil 78. As heat gathers in the thickened wall areas 240, 245, 256, 258, 274, 276, the airfoil 78 is not sufficiently cooled by the cooling fluid passing within the airfoil 78. The excessive heat can cause damage to or failure of the airfoil 78 during operation. Additionally, the increased thickness of portions of the airfoil 78 can resist or prevent natural flexion of the airfoil 78 during operation, which can further lead to damage or failure. Thus, the thermal stress reduction structures illustrated in FIG. 4 provide effective cooling to passages or cooling circuits within the airfoil 78, where otherwise thickened walls, can develop with the introduction of near wall cooling passages disposed adjacent to structural ribs.

As can be appreciated, the interior 96 of the airfoil 78 can comprise a plurality of passages defined by at least one structural rib extending between the pressure sidewall 98 and the suction sidewall 100. Additionally, at least one interior wall can define a plurality of near wall cooling passages 132, such that at least one thermal stress reduction structure, such as a cavity 140, can be provided between the structural rib and the wall. The airfoil 78 can comprise multiple thermal stress reduction structures, each of which can be associated with at least one near wall cooing passage 132.

It should be further appreciated that the thermal stress reduction structure can be adjacent to the pressure sidewall 98, the suction sidewall 100, the leading edge 102, or the trailing edge 104. The thermal stress reduction structures, with respect to the radial length of the airfoil 78, can extend along the entire length of the passages, ribs, or walls associated therewith, or extend only partially along the length of the airfoil 78, such that the thermal stress reduction structure is placed at advantageous points or lengths along the radial length of associated passages or cooling circuits.

It should be further appreciated that the internal walls defining the near wall cooling passages further define a double-wall structure, comprising the internal wall and at least one of the pressure sidewall, suction sidewall, leading edge, and trailing edge. The thermal stress reduction structures provide relief from excessive wall thickness that can develop at a junction between a rib and an internal wall, external wall, or a double-wall structure.

It should be further appreciated that the thermal stress reduction structures can provide heat relief to the internal structure of the airfoil 78, where the thickness of the internal walls, ribs, structures, or a combination thereof can retain a larger amount of heat or prevent effective cooling to the thick areas. Additionally, the thermal stress reduction structures can promote natural flexion of the airfoil 78, especially during the stress of operation, where excessive rigidity can cause cracking or failure of the airfoil 78.

The various embodiments of systems, methods, and other devices related to the invention disclosed herein provide improved thickness reduction as a thermal stress reduction structure for the interior of a turbine blade. One advantage that can be realized in the practice of some embodiments of the described systems is that one or more near wall cooling passages or circuits can be utilized in combination with one or more thermal stress reduction structures to incorporate the near wall cooling circuit without unnecessarily increasing the thickness of the internal structure and allowing for appropriate flexion of the airfoil. The implemented near wall cooling circuits and thermal stress reduction structures provide optimal cooling and airflow management within the interior of the airfoil, in order to maintain effective engine operation at heightened temperatures, increasing engine efficiency and lifetime. While the specific embodiments are described in terms of an airfoil in the form of a turbine blade, the description is equally applicable to any airfoil within the gas turbine engine, including, without limitation, turbine vanes, compressor blades and compressor vanes.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a gas turbine engine, the airfoil comprising:
    an outer surface bounding an interior and defining a pressure side and a suction side extending axially between a leading edge and a trailing edge and extending radially between a root and a tip;
    a structural rib spanning the interior and extending between the pressure side and the suction side of the outer surface to define a first direction of extension;
    multiple internal walls located near and extending along the outer surface in a second direction of extension, with the internal walls each at least partially defining a near wall cooling passage adjacent the outer surface; and
    multiple thermal stress reduction structures provided between the structural rib and the internal walls at a position adjacent a junction of the first and second directions of extension such that the structural rib is separated from the internal wall on both sides of the structural rib at the pressure side and both sides of the structural rib at the suction side.

2. The airfoil according to claim 1 wherein the thermal stress reduction structure comprises a gap between the structural rib and one of the internal walls at the junction.

3. The airfoil according to claim 2 wherein a length of the gap is less than or equal to a cross-sectional thickness of at least one of the structural rib or internal walls.

4. The airfoil according to claim 3 wherein the length of the gap is less than or equal to the cross-sectional thickness of a lesser of the cross-sectional thickness of the structural rib and the internal walls.

5. The airfoil according to claim 3 wherein the gap is adjacent the suction side.

6. The airfoil according to claim 5 wherein the gap is adjacent the leading edge.

7. The airfoil according to claim 6 wherein the airfoil is a blade for a first stage of a turbine rotor disk.

8. The airfoil according to claim 1 wherein at least some of the multiple thermal stress reduction structures are adjacent the suction side.

9. The airfoil according to claim 8 wherein at least some other of the multiple thermal stress reduction structures are adjacent the leading edge.

10. The airfoil according to claim 1 wherein the airfoil is one of a blade or vane for a turbine or compressor.

11. A blade for a gas turbine engine having a turbine rotor disk, the blade comprising:
    a dovetail having at least one cooling air inlet passage and configured to mount to the turbine rotor disk;
    an airfoil extending radially from the dovetail and having an outer surface bounding an interior and defining a pressure sidewall and a suction sidewall extending axially between a leading edge and a trailing edge and extending radially between a root and a tip, with the root being adjacent the dovetail;
    at least one cooling circuit fluidly coupled to the cooling air inlet passage and located within the interior, and having multiple interior walls forming multiple sets of near wall cooling passages along the outer surface, and a first structural rib extending between the pressure sidewall and the suction sidewall of the outer surface to separate the cooling circuit from the rest of the interior; and
    a cavity provided between the interior walls and the first structural rib such that the structural rib is separated from the interior walls on both sides of the first structural rib at the pressure sidewall and both sides of the first structural rib at the suction sidewall and that the multiple sets of near wall cooling passages are not formed by the first structural rib.

12. The blade according to claim 11 wherein a thickness of the interior walls at the cavity is less than or equal to a thickness of the first structural rib at the cavity.

13. The blade according to claim 12 wherein the thickness of the interior walls at the cavity is less than or equal to the thickness of the pressure sidewall or the suction sidewall at the cavity.

14. The blade according to claim 13 wherein the thickness of the interior walls, the first structural rib, and the pressure sidewall or the suction sidewall have equal thickness at the cavity.

15. The blade according to claim 11 wherein the cavity is adjacent the suction sidewall.

16. The blade according to claim 11 wherein the cavity is adjacent the leading edge.

17. The blade according to claim 11 comprising a second interior wall defining a second set of near wall cooling passages, wherein the multiple sets of near wall cooling passages is on one of the pressure sidewall and the suction sidewall and the second set of near wall cooling passages is on the other of the pressure sidewall and the suction sidewall, and a second cavity is located between the second interior wall and the first structural rib.

18. The blade according to claim 11 comprising a second structural rib extending between the pressure sidewall and the suction sidewall on an opposite side of the multiple sets of near wall cooling passages than the first structural rib and a second cavity is located between the first set of near wall cooling passages and the second structural rib.

19. The blade according to claim 11 wherein the blade is for a first stage of the turbine rotor disk.

* * * * *